United States Patent [19]
Richmond et al.

[11] 4,096,764
[45] Jun. 27, 1978

[54] POWER TRANSMISSION BELT STRUCTURE AND METHOD OF MAKING SAME

[75] Inventors: Kenneth D. Richmond, Nixa; Russell E. Hartman, Springfield; Jerry W. Rogers, Springfield; Jack Nelson, Springfield, all of Mo.

[73] Assignee: Dayco Corporation, Dayton, Ohio

[21] Appl. No.: 782,699

[22] Filed: Mar. 30, 1977

[51] Int. Cl.² ............................ F16G 5/16; B29H 7/22
[52] U.S. Cl. ...................................... 74/233; 156/139; 156/140
[58] Field of Search ...................... 74/231 P, 233, 234, 74/237, 232; 156/139, 140, 137

[56] References Cited

U.S. PATENT DOCUMENTS

| | | | |
|---|---|---|---|
| 3,566,706 | 3/1971 | Fix | 74/233 |
| 3,847,029 | 11/1974 | Ray | 74/233 |
| 3,964,329 | 6/1976 | Wolfe | 74/233 |

*Primary Examiner*—Leonard H. Gerin
*Attorney, Agent, or Firm*—Reuben Wolk

[57] ABSTRACT

A power transmission belt structure and method of making same are provided wherein such belt structure has substantially its entire periphery covered by an outer fabric layer adjoined by an elastomeric layer with at least a portion of the elastomeric layer and the fabric layer being the only structure defining a tension section of the belt structure.

20 Claims, 10 Drawing Figures

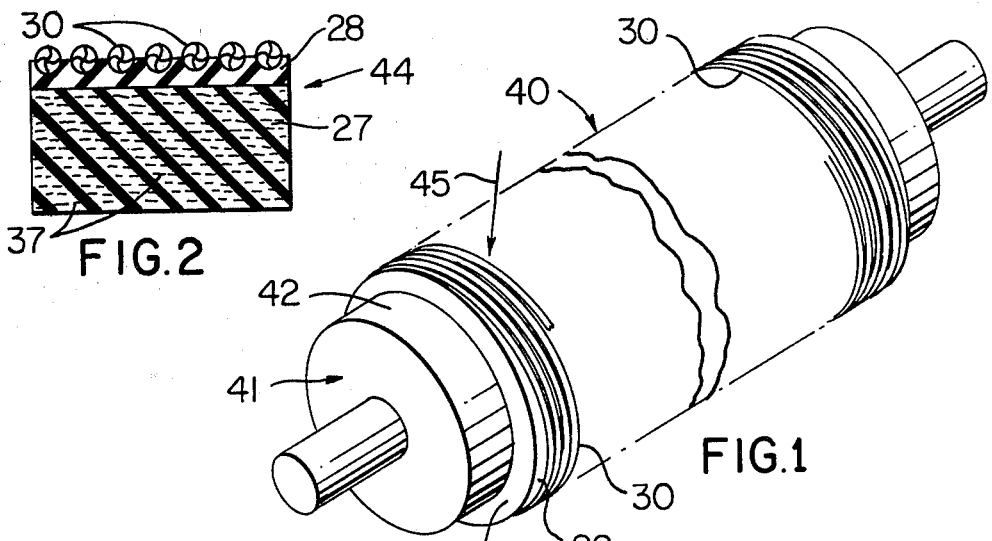
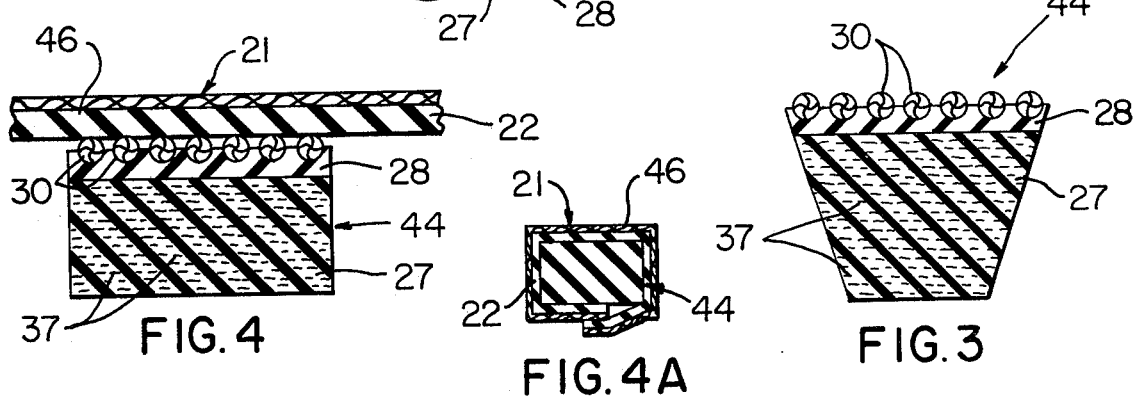
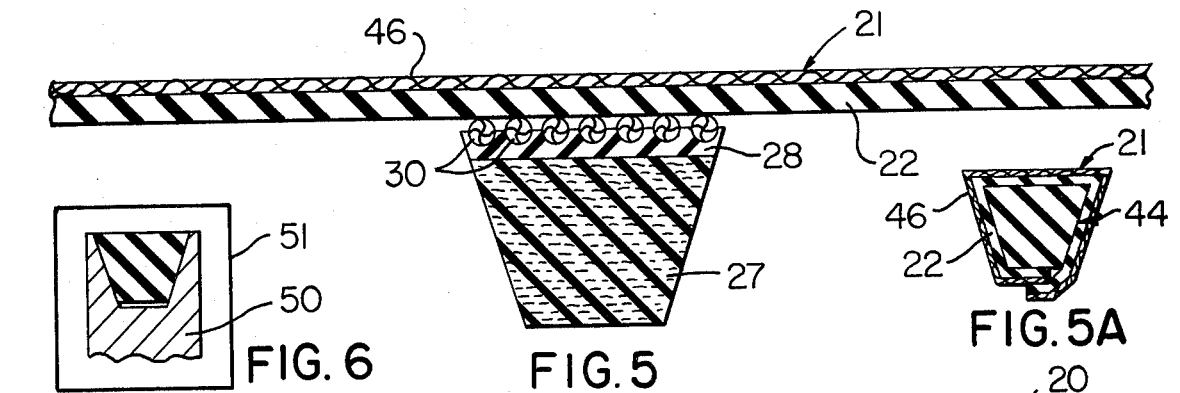
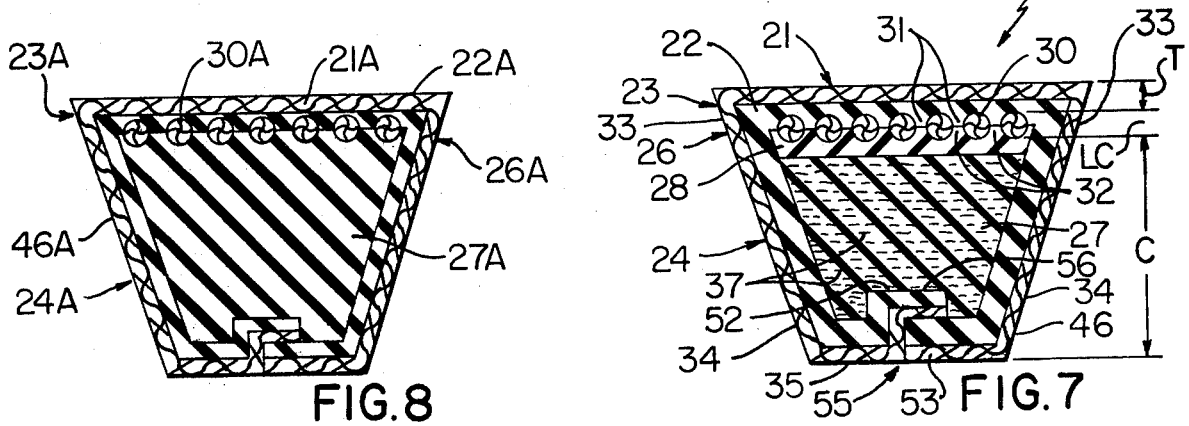

POWER TRANSMISSION BELT STRUCTURE AND METHOD OF MAKING SAME

BACKGROUND OF THE INVENTION

Fabric covered endless power transmission belts of trapezoidal cross-sectional outline are used in substantial quantities throughout industry and there are numerous manufactureres competing to produce these belts resulting in a highly competitive belt industry where there is a continuing effort to reduce belt cost without substantially impairing belt quality. A common technique employed to make such belts is to define what is popularly referred to as a belt sleeve on a cylindrical drum and the sleeve is ordinarily comprised of an inner sleeve portion defining a compression section of a belt, a load-carrying section usually including a helically would load-carrying cord disposed around the inner portion, and an outer portion which defines the tension section of the belt. The belt sleeve thus defined is suitably cured, cooled, and removed from its drum whereupon it is cut into individual belts and a fabric cover bonded against each belt.

With this usual procedure there are certain steps and costs which cannot be avoided whereby it is apparent that if any of the usually performed manufacturing steps could be eliminated or combined without detriment to the final belt structure or without impairing the performance capability of the final belt structure then the resulting belt costs would be minimized.

SUMMARY

It is a feature of this invention to provide a simple and economical fabric-covered belt structure.

Another feature of this invention is to provide a belt structure of the character mentioned having reinforcing means in at least one of its sections.

Another feature of this invention is to provide a power transmission belt structure having substantially its entire periphery covered by an outer fabric layer adjoined by an elastomeric layer with at least a portion of the elastomeric layer and the fabric layer being the only structure defining a tension section of the belt structure.

Another feature of this invention is to provide an improved method of making a power transmission belt structure of the character mentioned employing comparatively fewer method steps than ordinarily employed heretofore to make substantially the same structure.

Accordingly, it is an object of this invention to provide a power transmission belt structure and method of making same having one or more of the novel features set forth above or hereinafter shown or described.

Other details, features, objects, uses, and advantages of this invention will become apparent from the embodiments thereof presented in the accompanying specification, claims, and drawing.

BRIEF DESCRIPTION OF THE DRAWING

The accompanying drawing shows present preferred embodiments of the invention, in which FIG. 1 is a perspective view with parts broken away of a modified belt sleeve defined in accordance with the method of this invention supported on a mandrel and schematically illustrating a cutting device which may be employed to cut such belt sleeve to define a belt element either of the type shown in FIG. 2 or in FIG. 3 and as will be subsequently defined;

FIG. 2 is a cross-sectional view illustrating an embodiment of a belt element of roughly rectangular outline which may be defined from the belt sleeve of FIG. 1;

FIG. 3 is a view similar to FIG. 2 illustrating another embodiment of a belt element of substantially trapezoidal outline which may be defined from the sleeve of FIG. 1;

FIG. 4 is a cross-sectional view illustrating the manner in which a laminated sheet may be wrapped around the element of FIG. 2;

FIG. 4A illustrates the element of FIG. 4 drawn to a smaller scale and minus details with the laminated sheet wrapped therearound and prior to shaping and curing thereof;

FIG. 5 is a view similar to FIG. 4 illustrating the manner in which a laminated sheet may be wrapped around the element of FIG. 3;

FIG. 5A is a view similar to FIG. 4A of the element of FIG. 5 with the laminated sheet wrapped therearound and prior to shaping and curing thereof;

FIG. 6 is a fragmentary cross-sectional view illustrating the manner in which each wrapped element of FIG. 4A and FIG. 5A is final cured and simultaneously final shaped to define the power transmission belt structure of this invention;

FIG. 7 is a cross-sectional view illustrating the belt structure of either FIG. 4A or 5A as final cured, shaped, and cooled to define a completed belt of substantially trapezoidal cross-sectional outline; and FIG. 8 is a cross-sectional view illustrating a modification of the belt structure of this invention.

DESCRIPTION OF ILLUSTRATED EMBODIMENTS

Reference is now made to FIG. 7 of the drawing which illustrates one exemplary embodiment of a power transmission belt structure or belt of this invention which is designated generally by the reference numeral 20. The exemplary belt 20 is an endless structure of substantially trapezoidal cross-sectional outline and has substantially its entire periphery covered by an outer fabric layer 21 adjoined by an elastomeric layer 22 with at least a portion of the elastomeric layer 22 and fabric layer 21 being the only structure defining a tension section 23 of the belt 20 and such tension section is indicated in the zone T.

The belt 20 also has a compression section 24 indicated in the zone C and a load-carrying section 26 indicated in the zone LC. The compression section has a lower fiber-loaded portion 27 and an unloaded portion (free of fibers) 28 disposed as a layer 28 above portion 27. The load-carrying section 26 is comprised of a helically wound load-carrying cord 30 and a portion of the elastomeric layer 22 defines a cushion 31 disposed between helical turns of cord 30 above the so-called neutral axis, i.e. an axis through the centers of the turns of cord 30, of the load-carrying section 26. Similarly a portion of the layer 28 defines a cushion 32 disposed between helical turns of cord 30 below the neutral axis.

The elastomeric layer 22 and fabric layer 21 have portions thereof which comprise opposed side portions of the load-carrying section and such opposed side portions are each designated by the same reference numeral 33. In addition, the elastomeric layer 22 and fabric layer 21 have opposed side portions 34 and a bottom portion 35 which also comprise the outer parts of the compression section 24.

The fiber-loaded lower portion 27 of the compression section 24 is comprised of randomly dispersed reinforcing fibers a representative few of which are designated by the same reference numeral 37. The fibers 37 may be randomly dispersed in a non-oriented manner or such fibers may be oriented in any desired manner known in the art. For example, the fibers 37 may be dispersed with their longitudinal axes substantially parallel to the longitudinal axis of the belt 20 to increase the tensile strength of such belt or such fibers 37 may be dispersed with their longitudinal axes perpendicular to the longitudinal axis of the belt to increase the transverse rigidity or stiffness of belt 20, or the fibers 27 may be disposed with their longitudinal axes at any desired angle between parallel to the longitudinal axis of the belt to perpendicular such longitudinal axis.

The fibers 37 may be made of any suitable material known in the art and are preferably made of non-metallic organic fibers each having a diameter ranging between 0.001 inch and 0.050 inch and a length ranging between 0.001 inch and several inches of as much as 6 inches. The fibers 37 are suitably bonded in the elastomeric matrix material defining the lower portion of the compression section 24 and in some applications of the invention the fibers may be treated with suitable adhesive means to assure provision of a tenacious bond between such fibers and their matrix material. In this example the matrix material of lower portion 27 is a rubber matrix material.

The belt 20 is preferably made employing the method of this invention which, in essence, employs a minimum number of steps. Accordingly, and as shown in FIG. 1, a belt sleeve which is designated generally by the reference numeral 40 is formed around a rotatable mandrel assembly 41 of known construction. The belt sleeve 40 is formed by forming an inner tubular layer 27 directly against an outside surface 42 of the mandrel assembly 41; and, an outer tubular layer 28 is formed concentrically around and against layer 27 and for simplicity the same reference numerals 27 and 28 are used in the sleeve 40 as in corresponding portions of the compression section 24 of the belt 20 as shown in FIG. 7. A load-carrying cord also designated by the reference numeral 30, as in the belt 20, is disposed concentrically around the layer 28 to define the belt sleeve 40. The belt sleeve 40 may then be partially cured or left uncured; however, such sleeve is then cut to define belt elements and each belt element is an endless annular element designated generally by the reference numeral 44 and may have a cross-sectional configuration which is substantially rectangular, as shown in FIG. 2, or substantially trapezoidal as shown in FIG. 3. The cutting action may be achieved utilizing any suitable cutting device known in the art such as a cutting knife 45, designated schematically by an arrow 45.

The belt element of FIG. 2 may have a laminated sheet 46 wrapped therearound as shown in FIG. 4 to define the wrapped element of FIG. 4A while the belt element of FIG. 3 may have a laminated sheet 46 wrapped therearound as shown in FIG. 5 to define the wrapped element of FIG. 5A with the completely wrapped and shaped belt element being shown in FIG. 7. The laminated sheet 46 is defined by an outer fabric layer 21 and an elastomeric layer 22; and, as before, the layers 21 and 22 of sheet 46 are given the same reference numerals as in the belt 20. The elastomeric layer 22 is defined on the fabric layer 21 as a skim layer of substantial thickness by slightly modifying techniques which are well known in the art and preferably the layer 22 is an uncured layer. The layer 22 is preferably approximately equal in thickness to the thickness of the fabric layer 21; however, in FIGS. 4, 5, and 7 the thickness of layer 22 has been exaggerated for ease of drawing and reference numeral presentation in connection with the description.

At the completion of the step of wrapping the sheet 46 in position a substantially uncured or only partially cured wrapped belt element is defined. The partially cured wrapped belt element is then suitably heat cured and the curing may be achieved simultaneously with final shaping thereof and as shown in FIG. 6 which illustrates a belt element with the sheet 46 wrapped therearound being simultaneously cured and shaped employing a heated sheave assembly 50 and as is known in the art. The simultaneous shaping and curing may also be achieved employing a heated environment, such as a vulcanizer or conventional pot heater, which is shown schematically as a rectangular block 51 disposed around the heated sheave assembly 50.

The simultaneous curing and shaping, as disclosed in FIG. 6, for the trapezoidal belt element of FIGS. 5 – 5A amounts to a final formation or shaping of the trapezoidal belt cross section and for the rectangular belt element of FIGS. 4 – 4A amounts to a reconstruction of the basic rectangular shape to define the trapezoidal cross-sectional outline. Following the curing and shaping action the belt structure is suitably cooled in accordance with techniques shown in the art to define the completed belt structure or belt shown in FIG. 7. Further, it will be appreciated that in the completed belt structure of FIG. 7, the elastic layer 22 and fabric layer 21 have cooperating portions which define the only structure defining the tension section 23 of the belt 20.

As shown in FIG. 7 of the drawing the laminated sheet 46 is disposed about its associated belt element with an end portion 52 thereof being disposed inwardly of (toward the belt center) and overlapped by an end portion 53. The end portions 52 – 53 are disposed such that the inside surface of the belt is a substantially smooth surface and as illustrated at 55. It will be appreciated that part of the elastomeric layer 22 is reduced in thickness during the final formation of the belt and such reduced thickness end portion is designated by the reference numeral 56. It will also be appreciated that the opposed end portions of the laminated sheet 46, instead of being disposed with end portion 53 overlapped over end portion 52 may be disposed with their terminal end edges in abutting relation.

Another exemplary embodiment of the belt structure of this invention is illustrated in FIG. 8 of the drawing. The belt structure illustrated in FIG. 8 is very similar to the belt structure 20; therefore, such belt structure will be designated generally by the numeral 20A and parts of belt structure 20A which are very similar to corresponding parts of belt structure 20 will be designated by the same reference numerals as in the belt structure 20 also followed by the letter designation "A" and not described again in detail.

The belt structure 20A has a tension section 23A, compression section 24A, and load-carrying section 26A; however, it will be seen that the compression section 24A including its lower portion 27A is free of fibers therein. Except for the outer fabric layer 21A and the load-carrying cord 30A of associated section 26A the entire belt is made of a suitable elastomeric material which is unloaded or free of fibers, or the like. In addition, it will be seen that the load-carrying cord 30A is disposed directly on the upper portion of the compression section 24A.

The belt structure 20A is also preferably an endless belt structure and is made using the basic method disclosed above to make the belt structure 20. However, it will be seen that the elastomeric layer 22A is roughly the same thickness as the thickness of the fabric layer 21A. As indicated earlier, the belt 20 was illustrated with layer 22 shown having an exaggerated greater thickness than layer 21 for the ease of presentation.

In this disclosure of the invention each power transmission belt structure is shown with overlapped end portions defining the inside surface of the belt structure; however, it will be appreciated that the belt structure of this invention may be similarly defined by overlapping end portions similar to end portions 52 and 53 of belt 20 so that overlapped end portions define the outside surface of the endless belt and essentially as a smooth outside surface.

In this disclosure of the invention, the various component portions of the belt structures 20 and 20A have been cross hatched in the drawings as being made of rubber and it is to be understood that any suitable rubber compound may be employed, whether natural or synthetic rubber, to make same. However, it will be appreciated that in lieu of rubber any suitable synthetic plastic material may be employed.

Various terms such as upper, lower, above, below, and the like have been used in this disclosure of the invention to describe the relative positions to certain components and this has been done to describe the components as illustrated in the drawing. However, it is to be understood that these terms are not to be considered limiting in any way and the belt of this invention may be oriented in any desired manner.

The elastomeric layer 22 or 22A may also be provided with suitable reinforcing means such as fibers which may or may not be oriented, as desired, and in a similar manner as disclosed for portion 27 of the compression section 24 of belt 20.

In this disclosure of the invention reference is made to the outer layer 21 being in the form of a fabric layer and it is to be understood that the fabric layer may be of any suitable fabric, such as non-woven fabric, stress-relieved fabric, square-woven fabric, bias-laid woven fabric, knitted fabric, double knitted fabric, as desired.

While present exemplary embodiments of this invention, and methods of practicing the same, have been illustrated and described, it will be recognized that this invention may be otherwise variously embodied and practiced within the scope of the following claims.

What is claimed is:

1. A power transmission belt structure having substantially its entire periphery covered by an outer fabric layer adjoined by an elastomeric layer, at least a portion of said elastomeric layer and fabric layer being the only structure defining a tension section of said belt structure.

2. A belt structure as set forth in claim 1 defined as an endless belt structure.

3. A belt structure as set forth in claim 1 in which said elastomeric layer is made of a rubber compound.

4. A belt structure as set forth in claim 1 and also having a compression section and a load-carrying section with said elastomeric layer also defining a cushion disposed on one side of said load-carrying section.

5. A belt structure as set forth in claim 4 in which said load-carrying section is defined as a helically wound load-carrying cord.

6. A belt structure as set forth in claim 4 in which said elastomeric layer and fabric layer have portions thereof which also comprise opposed outer side portions of said load-carrying section and opposed outer side portions and a bottom portion of said compression section.

7. A belt structure as set forth in claim 4 and further comprising discrete reinforcing fibers disposed in at least one of said sections.

8. A belt structure as set forth in claim 7 in which said reinforcing fibers are randomly disposed in said one section which is said compression section.

9. A belt structure as set forth in claim 1 and also having a compression section and a load-carrying section and said belt structure when viewed in cross section has a substantially trapezoidal outline.

10. A belt structure as set forth in claim 9 and further comprising discrete reinforcing fibers disposed in one of said sections, said fibers being organic fibers each having a diameter ranging between 0.001 inch and 0.050 inch and a length between 0.001 inch and several inches.

11. A method of making a power transmission belt structure comprising the steps of, forming a belt sleeve having an inner layer and load-carrying means dispersed concentrically therearound, cutting said belt sleeve to define a belt element having a compression section portion defined by a part of said inner layer and a load-carrying section portion defined by a part of said load-carrying means, wrapping a laminated sheet defined by an outer fabric layer and an adjoining elastomeric layer around said belt element to define a wrapped belt element having at least a portion of said elastomeric layer and fabric layer as the only structure defining a tension section of said belt element, and curing said belt element to complete same as a unitary structure defining said belt structure.

12. A method as set forth in claim 11 and comprising the further step of shaping said wrapped belt element to define a wrapped belt element of substantially trapezoidal cross-sectional outline.

13. A method as set forth in claim 12 in which said shaping step is achieved simultaneously with said curing step.

14. A method as set forth in claim 13 in which said shaping and curing steps comprise shaping and curing with heated sheave means and a heated environment.

15. A method as set forth in claim 12 and comprising a further step of cooling said belt structure subsequent to said curing and shaping steps.

16. A method as set forth in claim 12 in which said cutting step comprises cutting said belt sleeve to define said belt element having a substantially rectangular cross-sectional outline and wherein said shaping step comprises changing said rectangular outline of said belt element to define said trapezoidal cross-sectional outline.

17. A method as set forth in claim 12 in which said cutting step comprises cutting said sleeve to define said belt element having a substantially trapezoidal cross-sectional outline and wherein said shaping step comprises refining the shape of said trapezoidal cross-sectional outline.

18. A method as set forth in claim 12 in which said forming step comprises forming a belt sleeve having said inner layer made of an elastomeric matrix having discrete organic fibers randomly disposed therein.

19. A method as set forth in claim 12 in which said forming step comprises forming said belt sleeve having said inner layer made of a rubber compound.

20. A method as set forth in claim 19 in which said forming step comprises forming said belt sleeve having said load-carrying means defined as a helically wound load-carrying cord.

* * * * *

UNITED STATES PATENT OFFICE
CERTIFICATE OF CORRECTION

Patent No. 4,096,764　　　　　　　　　Dated June 27, 1978

Inventor(s) K.D. Richmond, R. E. Hartman, J. W. Rogers and Jack Nelson

It is certified that error appears in the above-identified patent and that said Letters Patent are hereby corrected as shown below:

Column 1 of patent, line 9, "manufactureres" should be -- manufacturers --

Column 6 of patent, line 28 and 29, "dispersed" should be -- disposed --

Signed and Sealed this

Thirty-first Day of October 1978

[SEAL]

Attest:

RUTH C. MASON
Attesting Officer

DONALD W. BANNER
Commissioner of Patents and Trademarks